(12) United States Patent
Holzman et al.

(10) Patent No.: US 6,208,344 B1
(45) Date of Patent: Mar. 27, 2001

(54) SYSTEM AND PROCESS FOR MANIPULATING AND VIEWING HIERARCHICAL ICONIC CONTAINERS

(75) Inventors: Thomas G. Holzman, Marietta; Dick S. Amin, Duluth, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/124,496

(22) Filed: Jul. 29, 1998

Related U.S. Application Data

(60) Provisional application No. 60/054,346, filed on Jul. 31, 1997.

(51) Int. Cl.[7] ......................................................... G06F 3/00
(52) U.S. Cl. ............................................. 345/348; 345/356
(58) Field of Search .................................. 345/348, 349, 345/352, 353, 356, 357

(56) References Cited

U.S. PATENT DOCUMENTS

| | | | |
|---|---|---|---|
| 5,754,176 | * 5/1998 | Crawford | 345/338 |
| 5,835,094 | * 11/1998 | Ermel et al. | 345/355 |
| 5,917,492 | * 6/1999 | Bereiter et al. | 345/357 |

* cited by examiner

Primary Examiner—Raymond J. Bayerl
Assistant Examiner—Sy D. Luu
(74) Attorney, Agent, or Firm—Needle & Rosenberg, P.C.

(57) ABSTRACT

This invention provides graphical user interface mechanisms for grouping and viewing data elements in a manner analogous to the way in which their physical world counterparts would interact. A system is provided by which users manipulate a pointing device (e.g., mouse, trackball, or touch screen monitor) to position iconic representations of data elements in a graphical representation of space (e.g., on an electronic map). If one icon is placed on top of another one that is an allowable container for the moved icon (i.e., that can be a parent data element for the data element represented by the moved icon), the moved icon disappears from immediate view and is placed inside the container. The contents of container icons can be viewed by placing the graphical pointer on top of them, resulting in the "blow-up" of those icons so that iconic and textual descriptions of their child data elements are displayed. Additionally, users can drill down on any container icon to display its properties and those of its child data elements by performing a selection action (e.g., left mouse button click) on that container icon.

14 Claims, 7 Drawing Sheets

FIG. 5

Field Medic Coordinator, Version: 97.11.20

Name: Meyers, Woody | Patient ID: P98AFI3014 | Service No.:

Patient Mgmt ▼ | Patients ▼ | Incident Site | Simple Record | Detailed Record | Patient Profile | Patient Log | Query 22nd Field Ambulance Transport #2 — 504

501 — Destination: Map 1
502 — Route: Corridor 7 North
503 — ETA: 9 Minutes

Medics: Frederick Collins, 9999

512

Rhoderick Macdonald, P98AFI1947

Triage Priority:
  Delayed
Evacuation Priority:
  Priority two to next level of care via
Findings:
  Airway: Partial obstruction
  Airway: Clear
  Breathing: Normal
  Breath sounds: Clear, bilateral
  Circulation: Hemorrhage
  Disability: Alert
  Consciousness: Conscious & alert
  Contusion: Present, front upper re

511

Mark Lifeson, P98AFI2230

Triage Priority:
  Immediate
Evacuation Priority:
  Priority one to next level of care via
Findings:
  Airway: Clear
  Breathing: Normal
  Breath sounds: Clear, bilateral
  Circulation: Hemorrhage
  Disability: Alert
  Consciousness: Conscious & alert
  Open fracture: Present, front right
  Open fracture: Present, front uppe Woody Meyers, P98AFI3014 — 513

Triage Priority:
  Immediate
Evacuation Priority:
  Priority one to next level of care via
Findings:
  Airway: Clear
  Breathing: Slow
  Breath sounds: Clear, bilateral
  Circulation: Hemorrhage
  Disability: Unresponsive
  Consciousness: Unconscious
  Head assessment: Normal
  Chest movement: Increasing retra Point the cursor at an object on the screen to see help information here. | Elapsed Time: 00:32

SYSTEM AND PROCESS FOR MANIPULATING AND VIEWING HIERARCHICAL ICONIC CONTAINERS

The present utility patent application claims the benefit of priority of U.S. Provisional Patent Application No. 60/054,346, filed Jul. 31, 1997 pending.

BACKGROUND OF THE INVENTION

1. Field of the Invention

The present invention relates to a human-computer interface for displaying and operating on data elements in a computer database that describe the characteristics of physical objects existing outside of the data base. This human-computer interface graphically represents the locations of its corresponding physical objects in physical space and uses graphical icons as a means by which the user can associate one data element with another in a hierarchical relationship. The contents and properties of container object parent data elements may be viewed in a manner analogous to the means by which the corresponding physical objects could be opened for deeper views of their contents and properties.

2. Description of the Prior Art

Graphical user interfaces (GUIs), including representation of data elements through icons, are in common use in a variety of computer applications. However, prior art GUIs fall short in making visually clear the correspondence between data elements and objects in the physical world represented by those data elements. They are particularly weak in visually depicting the nature of parent-child relationships among data elements to elucidate their correspondence to hierarchical, or container, relationships among the physical objects they represent.

In prior art graphical user interfaces, the "opening" of an icon on a computer video display through use of a computer pointing mechanism, such as a mouse, results in the opening of a computer application (e.g., a word processing application comes up on the screen when the user "double clicks" on its icon), the display of other icons from which corresponding applications can be opened (e.g., as occurs when the user opens an icon representing a program group), or the display of similar icons with different text labels depicting a subordinate relationship to the selected icon (as occurs in utilities for navigating to particular files existing in hierarchical relationships). These mechanisms do not represent physical relationships of physical objects existing in three-dimensional space that are being represented as data elements in a computer data base.

Since some computer applications require graphical representation of "real world" objects, including their relative positions in space, and since the real world objects sometimes contain other objects, it is important for the computer application user to be able to see the location of the container object (parent data element) in a spatial representation as well as the contents (child data element or object) of the container, the properties of the container, and the properties of the objects it holds.

SUMMARY OF THE INVENTION

The present invention allows users to drag iconic representations of data elements, corresponding to physical objects outside of the computer, and drop them into iconic representations of other data elements, spatially depicting relationships between data elements that correspond to the relationships between their physical world counterparts. In computer science terminology, "data elements" and "data objects" (sometimes shortened to "objects") are used interchangeably and will be used as equivalent terms here as well.

The relationships represented by dropping one icon into another are frequently termed "parent-child," "container," "hierarchical," or "superordinate-subordinate." "Parent," "container," and "superordinate" are equivalent terms, referring to the "larger" object, the one represented by the icon into which the other icon is "dropped" by dragging and placing it on the same two dimensional coordinates of the graphical user interface as occupied by the parent, container, or superordinate object. "Child" and "subordinate" are equivalent terms, referring to the object that is dragged with the mouse or other pointing device so that it occupies the same two-dimensional space as the parent, container, or superordinate object. Once one icon is dropped into the other, the icon representing the child data element disappears from immediate view in much the same way that a physical object disappears from outside view once it is placed into a larger container. In this way, the present invention uses manipulations performed on a two-dimensional visual user interface to produce results corresponding to three-dimensional placement of objects inside each other.

When the user passes a graphical pointer over the icon for the parent data element, or container object, that icon is "blown up" to show the icons corresponding to the child data elements it contains. When the pointer is moved off of the blown up icon, it reverts to its previous iconic form, with icons and text corresponding to the child data elements no longer visible.

The present invention allows the developer to specify logical relationships between the icons so that the user cannot erroneously place one icon inside another for which there is no corresponding reality in the physical world.

This invention also allows the user to obtain a display of the properties of a data element by moving the computer's pointer (e.g., through mouse movement) over the icon corresponding to that element and then taking an additional action (e.g., mouse button click). The result is a display of properties of that data element or object as well as a display of the properties of any child data elements or objects it may have.

BRIEF DESCRIPTION OF THE FIGURES

FIG. 5 further illustrates FIG. 1, showing how the present invention allows the user to progressively drill down into detail about the data elements representing physical objects that were initially depicted as icons in physical space.

DETAILED DESCRIPTION OF THE INVENTION

Figure 1:
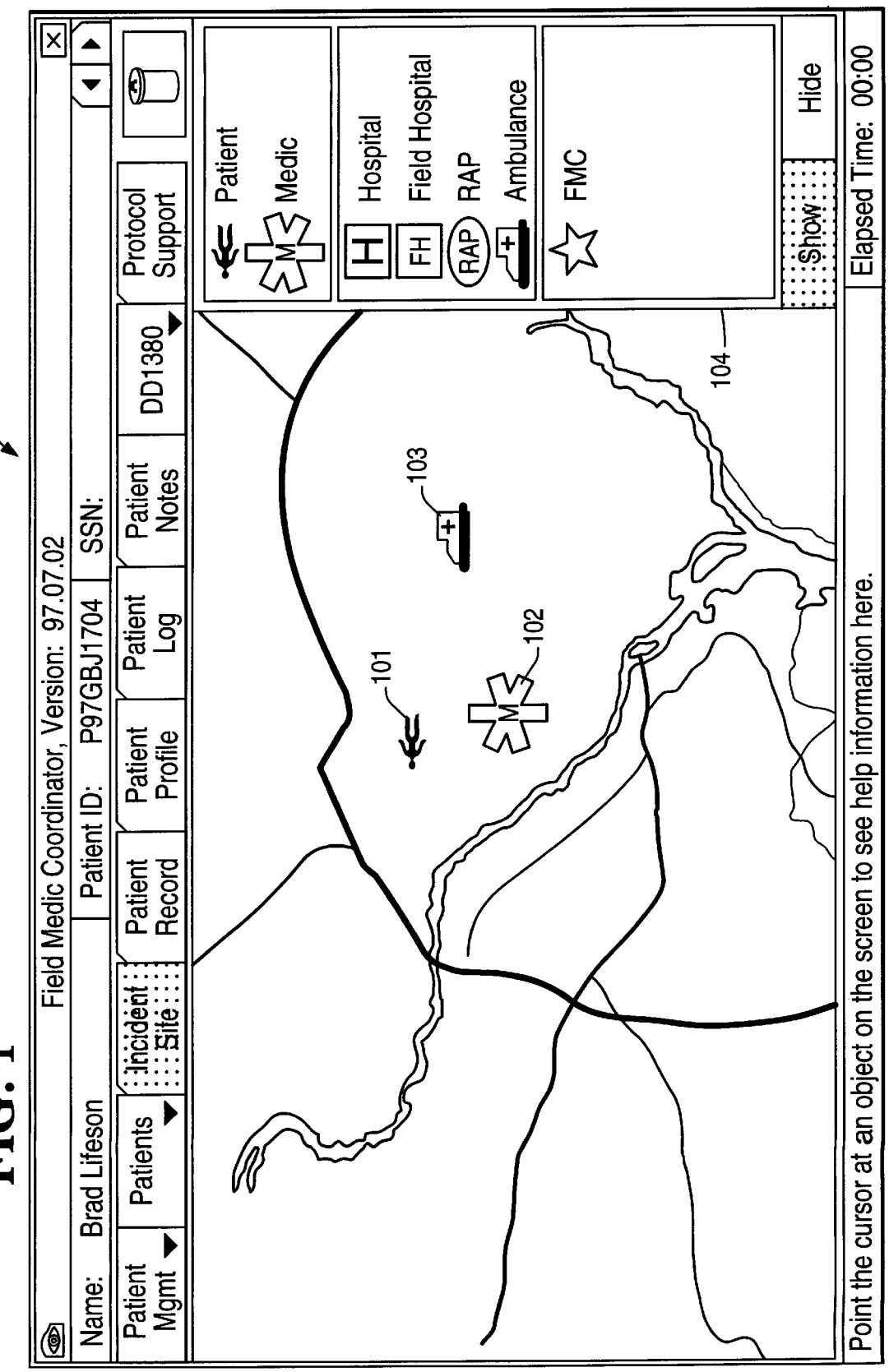
FIG. 1 illustrates icons corresponding to physical objects on an electronic map that can be rearranged in three-dimensional space through the methods taught by the present invention.

A preferred embodiment of the invention is now described in detail. Referring to the drawings, like numbers indicate like parts throughout the views.

One example of this invention for a field medical application is illustrated in the following figures. FIG. 1 shows an electronic map 100 of an emergency medical situation. On the map are, for example, patient, medic, and ambulance icons (101, 102 and 103, respectively). Their arrangement indicates that the patient 101 and medic 102 are currently outside of the ambulance 103; to the left (or west) of it as the figure is viewed.

The patient, medic, and ambulance icons 101, 102 and 103 can be moved around on the map by dragging and dropping with a mouse or other pointing mechanism (430 in FIG. 4, described in further detail later). More of these same kinds of icons or different types of icons (hospital, field hospital, etc.) can also be dragged from the legend 104 to the right of the map 100 and dropped on the map 100 to indicate their appropriate positions in physical space. Since the hospital, field hospital, regimental aid post (RAP), and ambulance in this example are container icons, other icons can be dragged and dropped into them to indicate that they have been moved into those other objects in the physical world. Thus, to show that the patient 101 and medic 102 are now inside the ambulance 103, the user could drag the patient and medic icons 101, 102 to the ambulance 103 and drop them there. Once one icon is dropped into the other, it disappears from immediate view (in much the same way that a patient disappears from exterior view when placed inside an ambulance, for example). Thus, dropping the patient and medic icons 101, 102 into the ambulance icon 103 of FIG. 1 would result in the view in FIG. 2.

Figure 2:
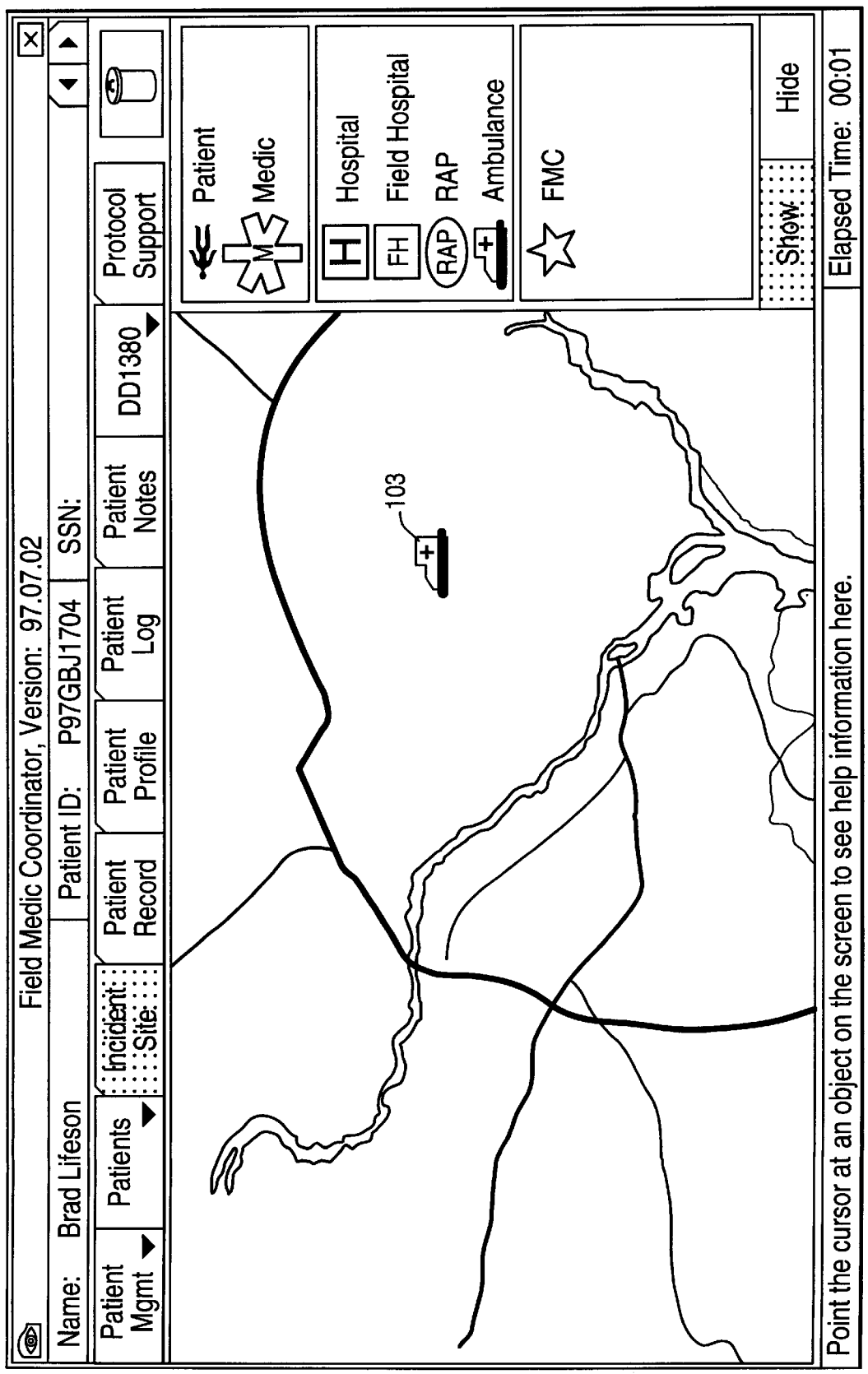
FIG. 2 further illustrates the electronic map of FIG. 1, showing how the graphical user interface would look after icons were dropped into container objects, instantiating parent-child data element relationships.
Figure 3:
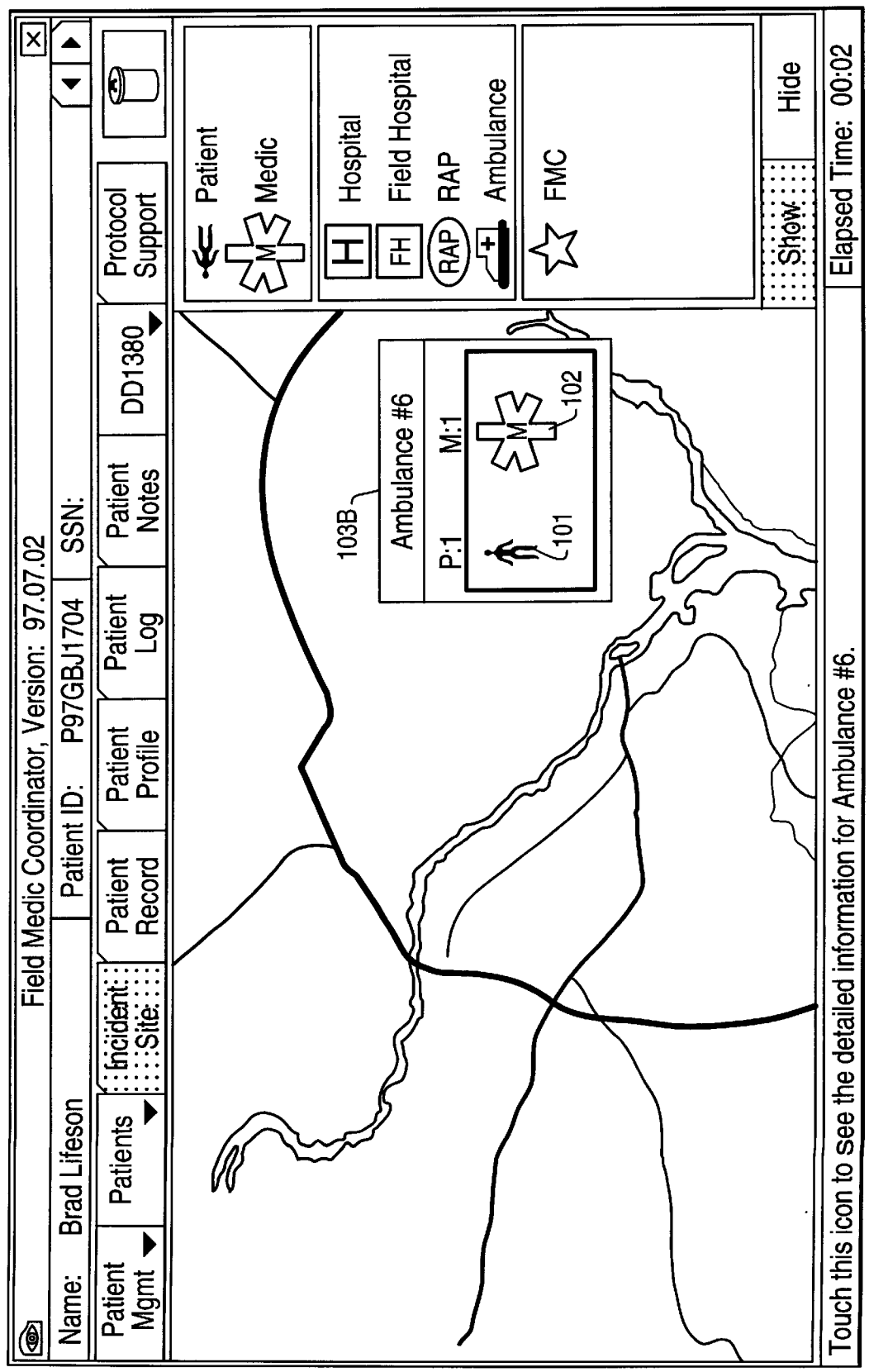
FIG. 3 illustrates how a container object (parent data element) icon can be "blown up" through the current invention to show its child data elements situated in a graphical representation of three-dimensional space.

When looking at FIG. 2 at first, it is not obvious whether there is anything inside of the ambulance container icon 103 and, if so, what it is. In order for the user to obtain this information at will, the present invention allows the user to simply place the pointer (controlled by pointing device 430) on the container object, resulting in a blow-up 103B, which displays the icons 101, 102 inside of the container icon. This view is illustrated in FIG. 3, where the existence of a medic 102 and patient 101 inside of the ambulance 103 now becomes obvious when the pointer is placed on top of the ambulance icon 103, resulting in its blow-up 103B.

If there were more than one of essentially the same type of object in the container, this invention provides the option of displaying each distinct icon just once, but showing the quantity of those objects above the icon. For example, if two medics 102 had been placed in the ambulance 103 instead of just one, the ambulance blow-up 103B in FIG. 3 could look the same except that the number following M: would be changed to 2. Alternatively, if there were too many types of icons to easily fit into the blow-up box at any given time or if the user or designer prefers to provide a distinct icon even for repetitions of the same type of object, the blow-up display could automatically provide a scroll bar with slider control. In that way, the user could scroll via pointing device 430 to see icons representing all child data element content for any container icon without requiring a huge amount of physical space on the electronic map to show the blow-up.

When the pointer is moved off of the blown-up container icon, it reverts to its earlier iconic form without its child data elements being displayed. In the medical illustration, if the pointer were moved off of the blown-up ambulance 103B showing its medic and patient passengers 101, 102, the ambulance icon 103 shown in FIG. 2 would reappear in place of the blow-up 103B.

Figure 4:
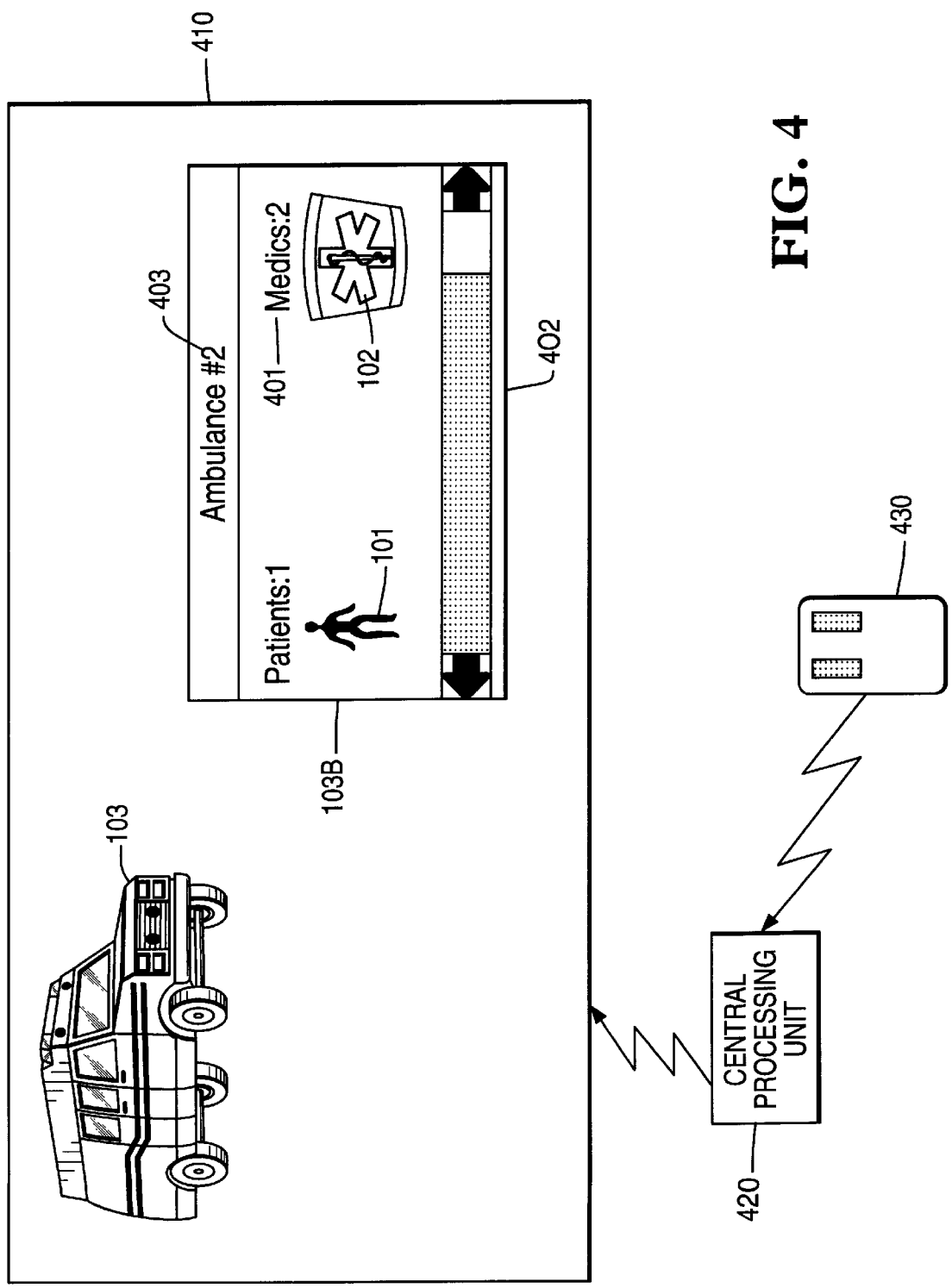
FIG. 4 is a block diagram identifying key elements and user interface mechanisms of the present invention for "blowing up" movable container object icons.

FIG. 4 summarizes the major elements in the blow-up movable icon container invention described in the previous paragraphs and figures, carrying forward the medical application as an example. A visual user interface display 410 presents data elements represented by icons, such as the ambulance icon 103 in this example, including their sample positions in physical space. If the user moves a pointer (e.g., an arrow moving in two-dimensional space corresponding to movements made with the pointing device 430 or touches applied to a touch sensitive visual display) over a container object icon (such as 103), the icon "blows up" to 103B and is depicted in terms of its associated child data elements in the area where the container icon 103 was previously displayed. Textual indications of the number and kind of child data elements in the container objects are displayed (401), as are iconic representations of the child data elements 101, 102. A visual slider 402 may appear, if needed, allowing the user to scroll across the contents of the container object 103B when there are more child data elements than can be displayed at once. An identification (ID) label 403 may be displayed associated with the parent data element, or container object 103B. A central processing unit 420 keeps track of the relationships established by the dragging and dropping of the icons with the pointing device 430 or touches applied to the visual interface display 410 and updates the content of the visual display 410 accordingly.

In terms of implementation, the present invention requires graphical user interface capabilities for its visual interface display 410. The programming language used to implement the present invention may access a graphical library to display the icons and their contents. The central processing unit 420 hardware may be chosen from a variety of standard CPU architectures, such as a standard PC running Windows 95 (or later), Windows NT, or equivalent. The particular CPU 420 chosen may vary with the complexity of the particular application of this invention. For example, the medical application described as an example implementation of the invention was initially designed to be hosted on a computer using a 486 processor with a 100 MHz clock speed and 24 Mb of random access memory (RAM), but of course a Pentium class or equivalent type of microprocessor may also be chosen.

If the user moves the pointer over a container icon (e.g., 103) and takes a selection action (clicks the left mouse button), the properties of the parent data element 103 and those of its child data elements may also be displayed rather than just an iconic and textual representation of the child data elements as was illustrated in FIG. 4. FIG. 5 illustrates in a medical context the outcome of moving the pointer over an icon representing Ambulance # 2 and making a selection action (left mouse button click). Detailed information about the ambulance and its "contents" (the medic and patients) is displayed. The screen depicted in FIG. 5 shows properties of the ambulance, including its destination 501, route 502, and estimated time of arrival 503. The name and ID of the medic (504) is shown. The names, IDs, triage priorities, evacuation priorities, and other clinically relevant facts are displayed in panes 511, 512 and 513 for each of the patients. The same display of properties can also be obtained by performing the selection action when the pointer is placed on top of the parent data element name (Ambulance #2 in FIG. 4) after the parent data element icon is already "blown up" with its child data elements represented as icons and text (e.g., reference numeral 103B, previously described).

Obviously, the kinds of properties of the container object and of the child data elements will change from one domain and application to another. The key point of the invention is that properties of the parent data element and the child data elements can be obtained by selecting the icon representing the container object (parent data element).

The present invention allows progressive "drilling down" in detail and progressive focusing on lower level data elements by placing the pointer over any particular element in the display and making a selection action. For example, in FIG. 5, if the user had moved the pointer over the name Mark Lifeson (in pane 512) and performed a selection action (e.g., clicked the left mouse button or tapped twice in quick succession on a touch screen over the name Mark Lifeson), the corresponding child data element (such as the detailed medical record for Mark Lifeson) would be opened. This would permit viewing and possibly editing of the properties of this data element. The same result could be accomplished by performing a selection action on the icon representing a particular child data element when the icon representing its container is blown up. Thus, if the user moved the pointer over the patient icon 101 illustrated in FIG. 4 and performed a selection action, the detailed record corresponding to that patient would be opened up.

The present invention allows the developer to specify logical relationships between the icons so that the user cannot erroneously place one icon inside another for which there is no corresponding physical reality. For example, properties can be assigned to the various containers that govern what types and even how many icons they can legitimately hold. Thus, if the user tried to place a hospital icon inside of an ambulance icon, the system would not allow it to be dropped in the ambulance. Likewise, if there were a physical limit on how many patients could be placed inside of an ambulance, attempts to put more patient icons into the ambulance would also be rejected.

Figure 6:
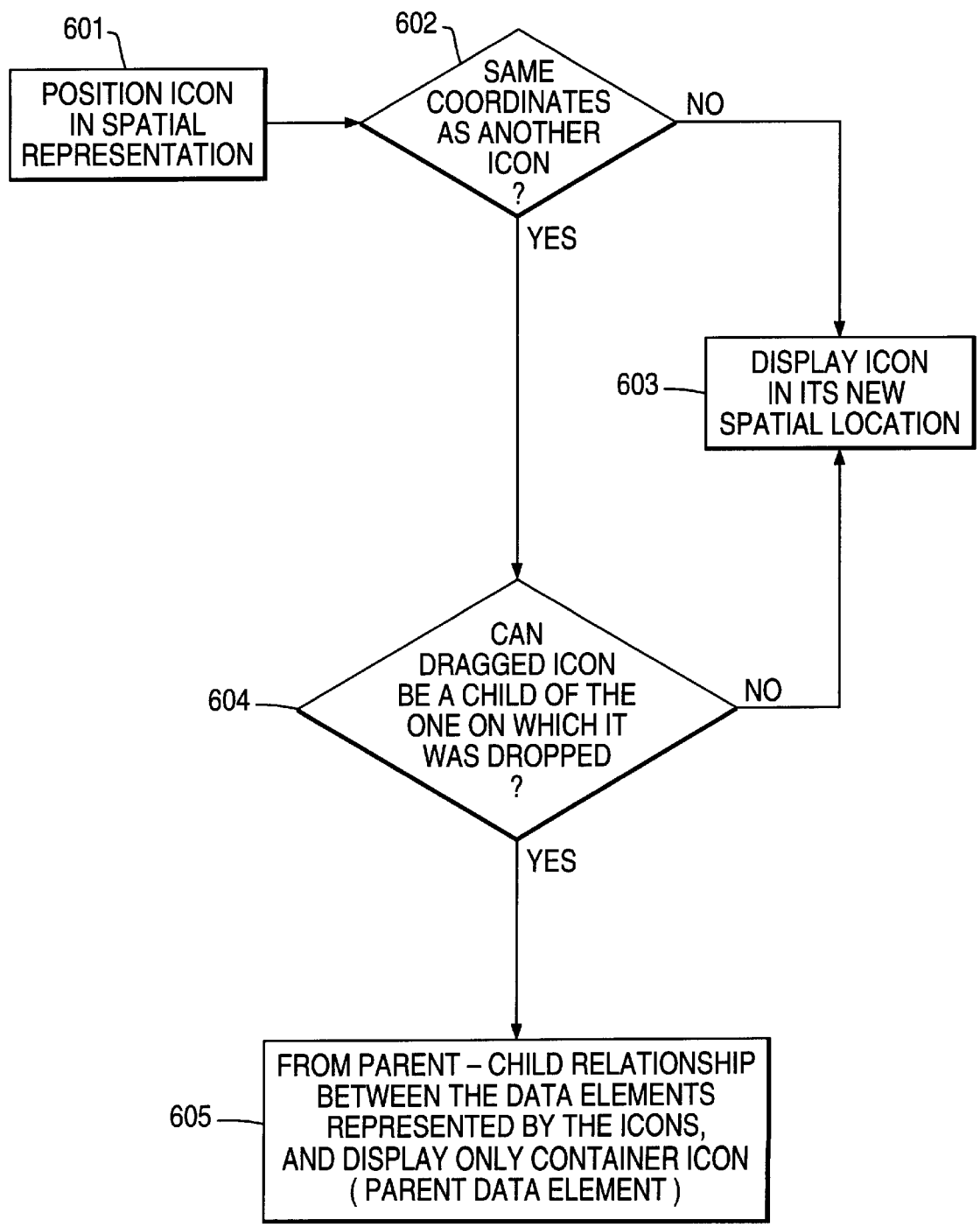
FIG. 6 is a process flow chart depicting how icons become re-positioned on the graphical user interface and come to represent parent-child relationships between data elements.

FIG. 6 provides an overview of the process by which icons become associated with each other in a parent-child relationship through the drag and drop operations of the present invention. In one embodiment, the process of FIG. 6 may be performed by CPU 420.

In step 601, the user passes the pointer over an icon and drags that icon to new coordinates on the graphical user interface. In step 602, the central processing unit 420 depicted in FIG. 4 then checks the new location of the moved icon to determine if it occupies the same two-dimensional space as another icon. If it does not, the icon is simply displayed in its new two-dimensional location (step 603) in the visual user interface display 410 that was previously discussed in conjunction with FIG. 4. If the dragged icon occupies the same two-dimensional coordinates as another icon, the central processing unit 420 then compares the properties of the data element or object represented by the dragged icon with those represented by the icon over which it was dropped to determine whether the dragged data element can legitimately be a child of the data element on which it was dropped (step 604). If these data elements do not have the properties that permit such a relationship, the dragged object simply remains displayed where it was dropped (step 603). If a parent-child relationship can exist, the central processing unit 410 makes this association between the data elements, and only the parent data element (the container data object) remains in view (step 605).

Figure 7:
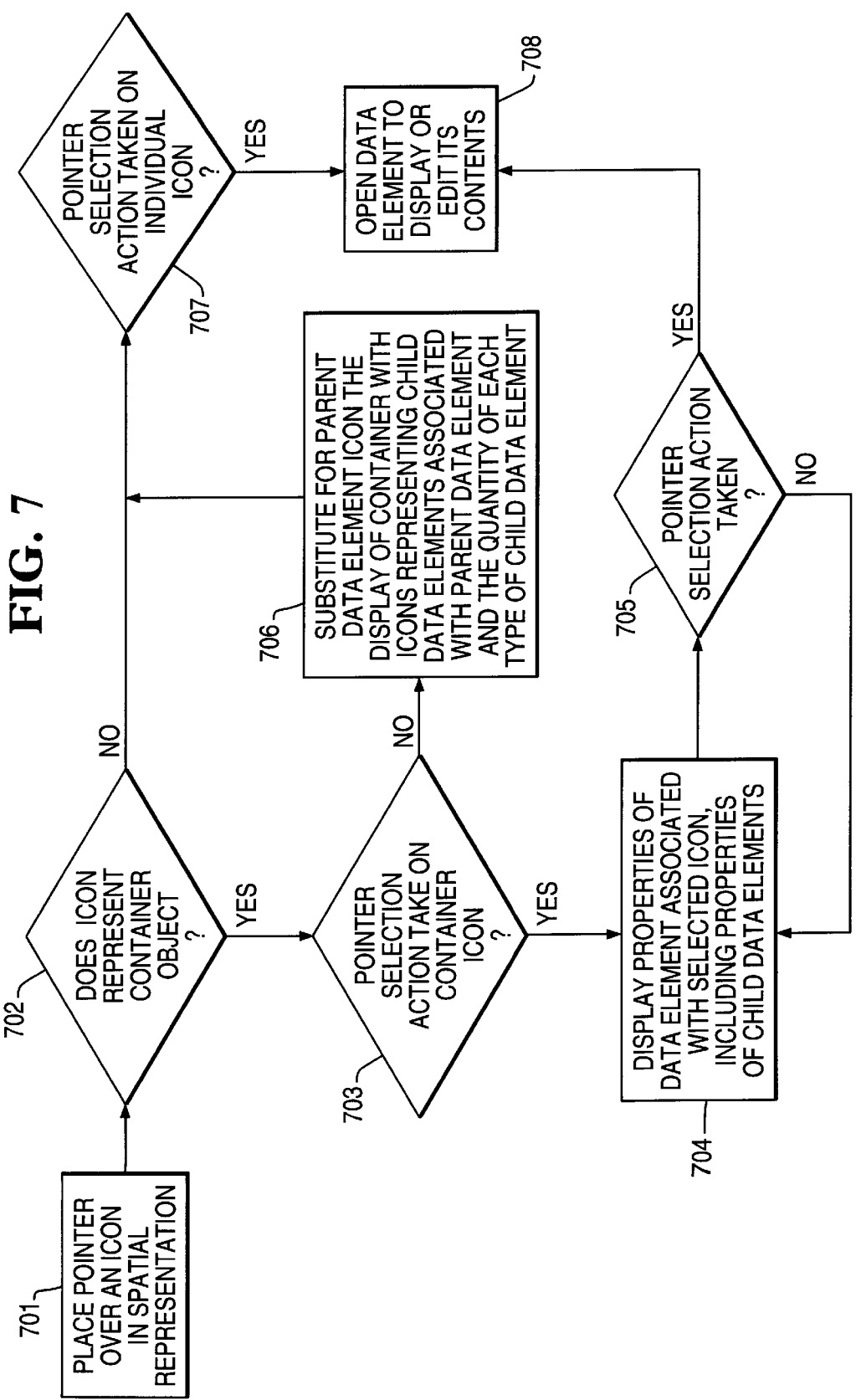
FIG. 7 is a process flow chart showing how container icons come to be "blown up," displaying their properties and child data elements, how the properties of any individual data element can be viewed, and how a data element can be opened to edit its contents through the graphical user interface mechanisms of the present invention.

FIG. 7 provides an overview of the process by which users can explode icon containers and see their child data elements or properties. Again, the process of FIG. 7 may be performed by the CPU 420.

If the user places the pointer over an icon in a spatial representation of data objects in step 701, the central processing unit 420 determines whether or not that icon represents a container object (parent data element) (step 702). If that icon represents a container object, the central processing unit 420 then checks whether or not a pointer selection action has taken place (step 703) (e.g., whether or not the user has clicked the left mouse button or tapped twice in quick succession on a touch screen). If a selection action has taken place, the system displays the properties of the container object (parent data element) and of any child data elements it contains (step 704). Drilling down further into the details of the data elements, the system monitors whether the user places the pointer on the properties belonging to an individual data element and takes a selection action (e.g., clicks the left button of the mouse or makes two quick taps on the screen over the properties associated with a particular data element) (step 705). If such a selection action is detected, that particular data element is opened to display its contents and enable their editing (step 708). On the other hand, if the system determines that no selection action took place after the pointer was placed on a container icon (step 703), the central processing unit 420 displays an iconic and textual representation of the child data elements (step 706), as was previously illustrated in the medical example of FIG. 4 for Ambulance 2. If the user performs a selection action on any individual icon (child data element) that is displayed after the pointer rests on a container object (step 707), that data element opens to show its contents and enable editing of the contents (step 708). If the user places the pointer on an icon that the system determines to not represent a container object (step 702), the system goes on to determine whether or not a selection action was also taken (step 707). If a selection action was taken, that non-container data element is opened, displaying its contents (properties) and enabling its editing (step 708). On the other hand, if the system determines that the pointer is placed on an icon not representing a container object (step 702) and that no pointer selection action has taken place on that icon (step 707), the system simply displays an identifier for that data element (step 709). For example, in the medical illustration, if the user placed the pointer on an icon representing a patient (which is not defined as a container object) and no selection action took place, the system might simply pop up the name or identification number for that patient. If, on the other hand, the user performed a selection action on that patient, his or her medical record would then be displayed, enabling the user to view and modify its contents.

What is claimed is:

1. A user interface system for use with a multi-level hierarchical data structure, the multi-level hierarchical data structure including at least one child data element and apparent data elements at a next higher level, and wherein each child data element may include positioning coordinates relative to its parent data element, the user interface system comprising:

(a) display means for displaying to a user of the user interface system a first set of iconic representations, each of the first set of iconic representations corresponding to one of the parent data elements at a selected level of the multi-level hierarchical structure, and each of the first set of iconic representations being positioned on the display means at a selected location correspond to the parent data element's associated coordinates;

(b) pointing means coupled to the video display for visually pointing to a selected one of the first set of iconic representations displayed by the display means;

(c) means, responsive to the pointing means for directing the display means to display a second set of iconic representations at the selected coordinates, each of the second set of iconic representations corresponding to one of the child data elements associated with the parent data element corresponding to the selected one of the first set of iconic representations; and (d) means for establishing what data elements corresponding to iconic representations are allowed to be parents or children of other data elements corresponding to iconic representations.

2. The user interface system of claim 1, further comprising:

(d) means, responsive to the pointing means, for directing the display means to display the quantity of each distinct type of child data element associated with the parent data element corresponding to the selected one of the first set of iconic representations.

3. The user interface system of claim 1, further comprising:

(d) means, responsive to the pointing means, for reverting to the display of only the iconic representation of the parent data element when the visual pointer is removed from the coordinates corresponding to the location of the iconic representation of that parent data element or its child data elements.

4. The user interface system of claim 1, further comprising:

(d) means, responsive to the pointing means, for displaying on the display means properties associated with a data element when the corresponding iconic representation is pointed to by the pointing means.

5. The user interface system of claim 1, further comprising:

(d) means, responsive to the pointing means, for simultaneously displaying on the display means properties of multiple child data elements when the iconic representation corresponding to the parent data element is pointed to by the pointing means.

6. The user interface system of claim 1, wherein the coordinates are specified in two dimensions.

7. The user interface system of claim 1, wherein the pointing means is one of the following: a mouse, a trackball, a positioning control on a keyboard, or a touch-sensitive visual display screen.

8. In a user interface system for use with a multi-level hierarchical data structure, the multi-level hierarchical data structure including at least one child data element and apparent data elements at a next higher level, and wherein each child data element may include positioning coordinates relative to its parent data element, a process comprising the steps of:

(a) displaying to a user of the user interface system a first set of iconic representations, each of the first set of iconic representations corresponding to one of the parent data elements at a selected level of the multi-level hierarchical structure, and each of the first set of iconic representations being positioned on the display means at a selected location correspond to the parent data element's associated coordinates;

(b) inputting a signal from a user of the user interface system corresponding to a selected one of the first set of iconic representations displayed in step (a);

(c) responsive to the pointing means, displaying to the user of the user interface system a second set of iconic representations at the selected coordinates, each of the second set of iconic representations corresponding to one of the child data elements associated with the parent data element corresponding to the selected one of the first set of iconic representations; and (d) establishing what data elements corresponding to iconic representations are allowed to be parents or children of other data elements corresponding to iconic representations.

9. The process of claim 8, further comprising the step of:

(d) responsive to the pointing means, directing the display means to display the quantity of each distinct type of child data element associated with the parent data element corresponding to the selected one of the first set of iconic representations.

10. The process of claim 8, further comprising the step of:

(d) responsive to the pointing means, reverting to the display of only the iconic representation of the parent data element when the visual pointer is removed from the coordinates corresponding to the location of the iconic representation of that parent data element or its child data elements.

11. The process of claim 8, further comprising the step of:

(d) responsive to the pointing means, displaying on the display means properties associated with a data element when the corresponding iconic representation is pointed to by the pointing means.

12. The process of claim 8, further comprising the step of:

(d) responsive to the pointing means, simultaneously displaying on the display means properties of multiple child data elements when the iconic representation corresponding to the parent data element is pointed to by the pointing means.

13. The process of claim 8, wherein the coordinates are specified in two dimensions.

14. The process of claim 8, wherein the pointing means is one of the following: a mouse, a trackball, a positioning control on a keyboard, or a touch-sensitive visual display screen.

* * * * *